United States Patent [19]

Casey et al.

[11] Patent Number: 4,730,216

[45] Date of Patent: Mar. 8, 1988

[54] RASTER DISTORTION CORRECTION CIRCUIT

[75] Inventors: Robert F. Casey, Oradell; Werner F. Wedam, Lawrenceville, both of N.J.

[73] Assignee: RCA Corporation, Princeton, N.J.

[21] Appl. No.: 881,710

[22] Filed: Jul. 3, 1986

[51] Int. Cl.⁴ .................... H04N 11/20; H04N 7/01
[52] U.S. Cl. ............................... 358/140; 358/11
[58] Field of Search .............. 358/11, 12, 31, 140, 358/242

[56] References Cited

U.S. PATENT DOCUMENTS

| 3,893,174 | 7/1975 | Sano et al. | 358/65 |
| 4,463,288 | 7/1984 | Judd | 315/371 |
| 4,598,309 | 7/1986 | Casey | 358/11 |
| 4,670,772 | 6/1987 | Bolger | 358/11 |

OTHER PUBLICATIONS

"Digital System for Horizontal Geometry and Convergence Correction", in the name of R. Deubert, that appeared in digest of technical papers for IEEE International Conference on Consumer Electronics, 1984.
"Digital System for Horizontal Geometry and Convergence Correction", in the name of R. Deubert that appeared in IEEE Transactions on Consumer Electronics, vol. CE-30, No. 3, Aug. 1984.

*Primary Examiner*—Tommy P. Chin
*Attorney, Agent, or Firm*—Eugene M. Whitacre; Joseph J. Laks; Sammy S. Henig

[57] ABSTRACT

In an apparatus for displaying the picture information of an incoming interlaced television signal in noninterlaced raster scanning display on the faceplate of a picture tube, each video line of the television signal is separated into R, G and B color component signals. Each video line is compressed, or speeded-up, at a variable rate and delayed by a variable delay time to provide a speeded-up signal that is coupled to the corresponding electron beam gun of the picture tube. Each of the variable rate and delay is controlled in accordance with information relating to distortions of the raster scanning display. In this way, distortion, such as east-west or convergence, is reduced when the speeded-up signal is displayed.

24 Claims, 6 Drawing Figures

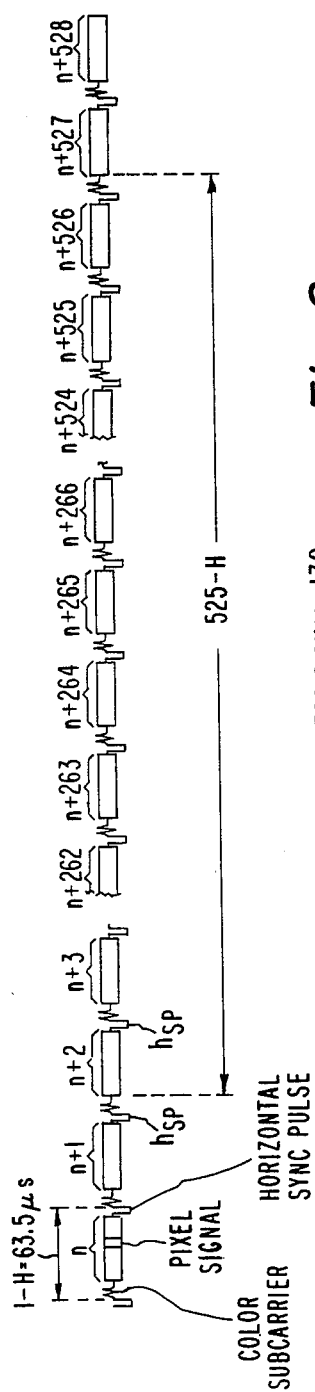
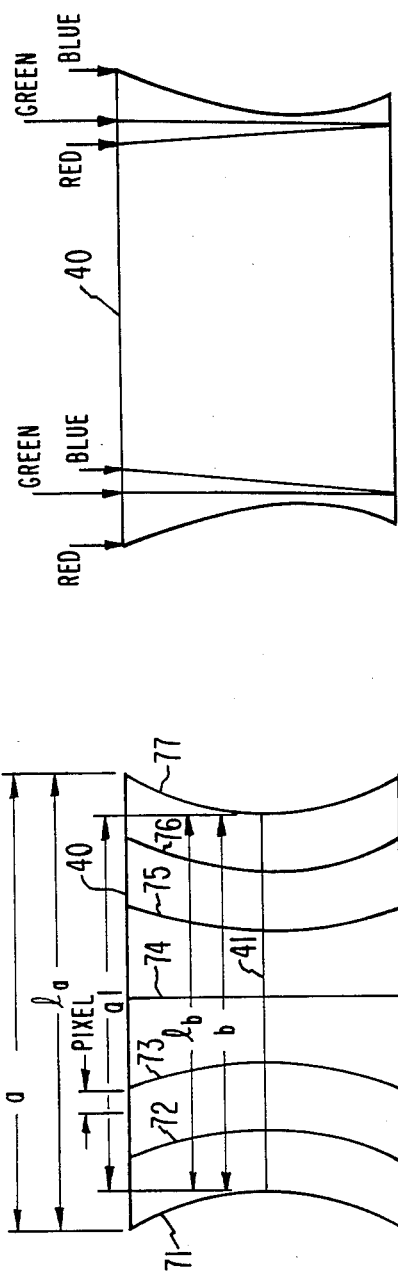
Fig. 2
Fig. 4

RASTER DISTORTION CORRECTION CIRCUIT

The invention relates to video display systems and, more particularly, to a raster distortion correction circuit in a video display apparatus.

Recent interest in the development of high definition television systems (HDTV) has been directed towards techniques that are intended to enhance the subjective performance of present systems within the constraints of existing standards. One approach, a technique referred to as progressive scan, or non-interlaced scan, has been described in patent materials and literature. For example, all the scan lines are scanned, consecutively, from the top of the cathode ray tube (CRT) display screen and downward to the bottom of the display screen during each vertical scanning interval. Progressive scan results in the reduction of interlaced scanning format related artifacts such as interline flicker.

In progressive scan double-frequency scanning format, for example, the incoming interlaced television signal, such as illustrated schematically in FIG. 2, may be processed in well known techniques to produce, for example, pairs of video lines of R, G and B color component video signals, whose picture content is to be displayed in corresponding pairs of scan lines of the progressive scanned raster. A video line of each color component video signal may include, during a period H of a given video line, that in NTSC, for example, is 63.5 microsecond long, a picture information containing portion that is 52.6 microseconds long and that represents the active portion of the video line. This active portion may be considered as being divided into a series of pixel signals that represent associated pixels, or picture elements, that are displayed at corresponding locations within a corresponding horizontal scan line. The pixel signals may be distributed uniformly in time throughout the active portion of the video line.

In some prior art progressive scan systems, the incoming television signal is sampled at a given rate that meets the Nyquist criteria. The samples are further processed to obtain processed samples that represent the pixel signals of the video line pairs of the color component video signals. The pixel signals are stored at a given rate in a storage element such as, for example, a line store, and then read out at a rate higher. In this way, each video line is speeded-up or time-compressed. A given speeded-up video line of a given line pair is time-multiplexed with the other speeded-up video line of that line pair, to provide a noninterlaced time compressed color video signal that is applied to the cathode of the corresponding gun of the CRT. The noninterlaced time compressed color video signal is displayed in a progressive scan manner on the screen of the television receiver. The duration of each line of the time compressed color video signal is, for example, half that of the corresponding incoming interlaced television signal.

In a raster scanning display system, display distortions, such as east-west and linearity distortions, may occur. Additionally, convergence distortion of the tricolor electron beams may also occur. For example, when a television video signal that contains picture information of a pattern of, for example, vertical lines is displayed on a cathode ray tube (CRT) screen, east-west distortion, if left uncorrected, will produce the pattern shown in FIG. 4a. Note that the separation $1_a$ between distorted vertical lines 77 and 71 along a horizontal scan line 40 at the top, or along a horizontal scan line 40' at the bottom of the screen is greater than the corresponding separation $1_b$ along a horizontal scan line 41 at the center of the screen. The different separations occur because the geometry of the CRT is such that the electron beam travels a longer distance at the top or bottom of the screen than at the center, during the same corresponding portions of the trace interval.

Another geometry related distortion may create non-overlapping color images when the CRT screen is scanned by the tricolor electron beams. The mismatch among the corresponding color images produces convergence error. A convergence error that may occur when a vertical bar is displayed, is shown in FIG. 4b.

In some interlaced display systems, raster distortion is corrected by storing the picture information of an incoming interlaced video signal in a memory and then by reading out the stored information to form an output interlaced video signal that is coupled to an interlaced video display. The stored information is read out, sequentially, using a clock signal. The clock signal has a frequency that varies in accordance with a distortion information providing signal. The distortion information providing signal varies in accordance with the location on a faceplate of the video display where the picture information of the output interlaced video signal that was read out from the memory is displayed. The output interlaced video signal is then displayed without observing raster distortion of the picture. The output interlaced video signal includes video line signals that occur at the horizontal rate, the rate in which the video line signals of the incoming interlaced video signal occur. The output interlaced video signal that provides raster distortion correction may not, by itself, be suitable for providing picture information to a noninterlaced display since it must first be time-compressed to be suitable for display in the noninterlaced video display. Disadvantageously, such time-compression, may result in the loss of the timing information that provides the raster distortion correction.

In accordance with an aspect of the invention, a video display apparatus responsive to an incoming interlaced video signal is used for generating from the video signal a noninterlaced video signal that contains in a given video line signal a plurality of pixel signals derived from interlaced video signal. The pixel signals are capable of being displayed in a corresponding plurality of pixel locations of a corresponding display line of the video display apparatus. The video display apparatus is subject to a distortion that, if left uncompensated, results in erroneous pixel locations during noninterlaced display of the pixel signals. The apparatus includes a memory for storing picture information derived from the interlaced video signal. A memory clock generator is used for generating the plurality of pixel signals contained in the noninterlaced video signal from the picture information stored in the memory. A correction signal that varies in accordance with the distortion is generated. The clock signal is varied in accordance with the correction signal to generate the plurality of pixel signals in a manner that varies in accordance with the clock signal so as to compensate for the erroneous pixel locations.

In accordance with another aspect of the invention, in a progressive scan display system that displays a picture derived from an interlaced video signal, the pixel signals of a given video line of a first speeded-up color components video signal are time-distributed in such a way that the corresponding pixels in each corresponding scan line of the CRT are displayed at appropriate locations in a manner that produces a picture that appears undistorted.

In accordance with a yet another aspect of the invention, both video signal speed-up, that is used in the process of displaying the interlaced incoming television signal in a noninterlaced scanning format, and raster distortion correction are performed simultaneously and by common speed-up circuit components. Advantageously, the circuit complexity involved in additionally implementing the raster distortion correction scheme of the invention is relatively small.

In accordance with a further aspect of the invention, a voltage controlled oscillator (VCO) generates an output signal that is utilized for speeding-up each pair of color component video signals. The VCO output signal may be used as a clock signal having a programmable frequency for clocking-out the pixel signals of each stored video line signal that are stored in the storage element. The clock rate is programmed for obtaining a nonuniform distribution of pixel signals that are read out of the storage element. The VCO output signal has a frequency that, is periodically calibrated to reduce frequency drift that may occur because of, for example, circuit component characteristics change. Such frequency drift, if left uncorrected, may cause display distortions.

FIG. 2 illustrates, schematically, the timing diagram of an NTSC signal that is coupled to the video display apparatus of FIG. 1;

FIGS. 4a and 4b illustrate display distortions caused by east-west pincushion distortion and horizontal convergence error, respectively, when the incoming television signal contains a picture of vertical bars;

Figure 1:
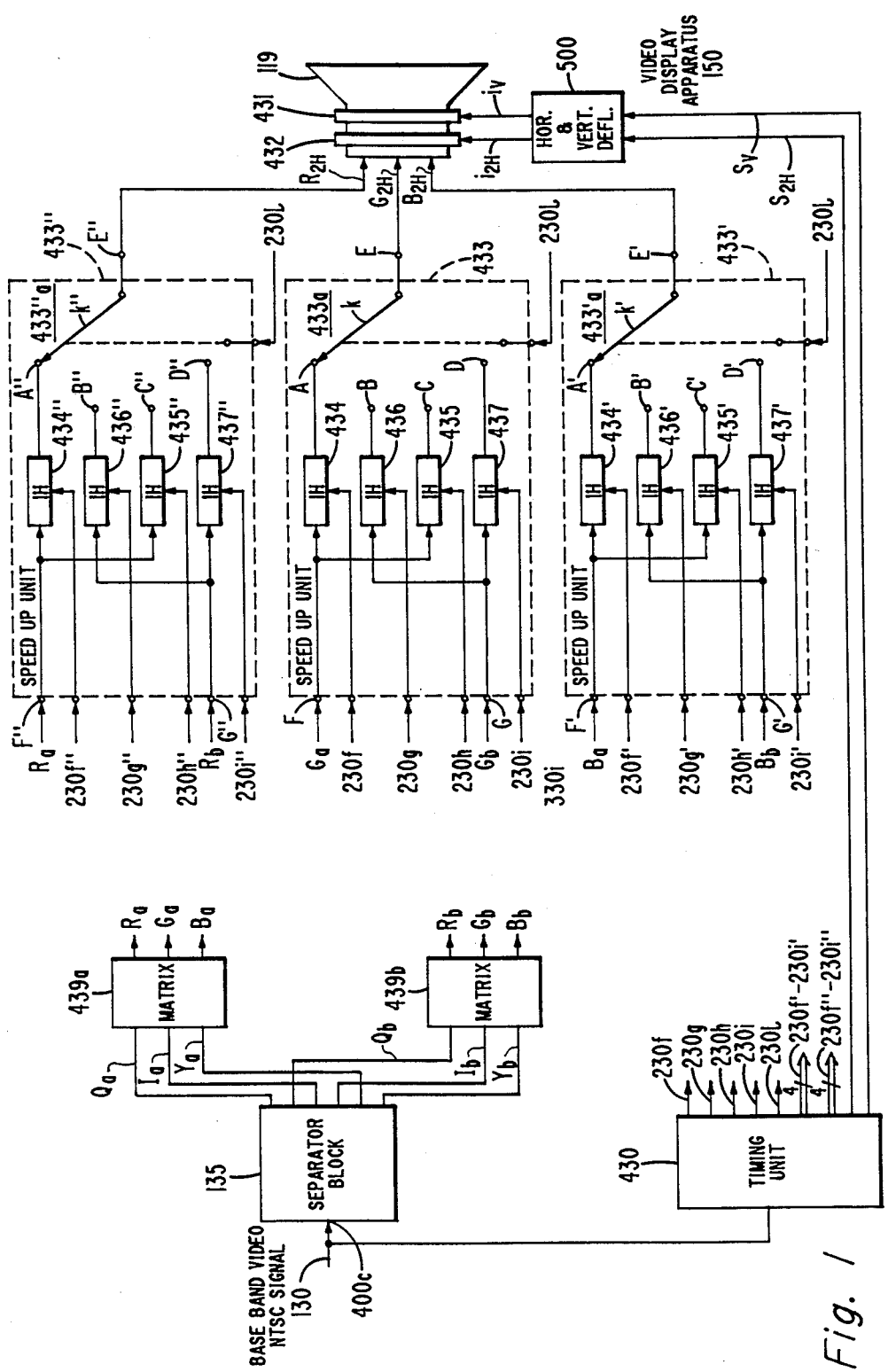
FIG. 1 illustrates a video display apparatus embodying aspects of the invention that generates speeded-up red, blue and green video signals.

FIG. 1 illustrates a video apparatus 150, embodying aspects of the invention, or displaying in a CRT 119 the picture information of an interlaced NTSC television signal 130 of FIG. 2 in a non-interlaced scanning format. Similar numbers and symbols in FIGS. 1 and 2 represent similar items or functions. NTSC signal 130 of FIG. 2 is applied, from a source which is not shown, to a terminal 400c of a separator block 135 of FIG. 1. The source of signal 130 may be the demodulated output of a standard IF stage.

Separator block 135, such as may be used in a progressive scan system, generates during each video line, such as line n of NTSC signal 130 of FIG. 2, two groups of concurrent video line component signals. The signals of the first group, signals $I_a$, $Q_a$ and $Y_a$ of FIG. 1, are derived from the corresponding I, Q and Y component signals, respectively, from NTSC signal 130. The first group contains picture information for display in each display line of a first set of alternate display lines of CRT 119 screen. The signals of a second group, signals $I_b$, $Q_b$ and $Y_b$, are also derived from the corresponding I, Q, and Y component signals, respectively, from NTSC signal 130. The second group contains picture information for display in each display line of a second set of alternate display lines that are displayed on CRT 119 screen between the corresponding display lines of the first set to form a picture frame. When the picture information displayed in a given display line is supplied from each signal of the first group of signals, the picture information displayed in the immediately preceding or following display line is supplied from each signal of the second group of signals.

In one example, signals $I_a$, $Q_a$ and $Y_a$ may be identical to signal $I_b$, $Q_b$ and $Y_b$, respectively. In such example, each of the corresponding signals $I_a$, $Q_a$ and $Y_a$ may be obtained from NTSC signal 130 using conventional signal component separation techniques. However, different methods have evolved in progressive scan systems for generating the two groups of concurrent video line signals such that the two groups that are not identical provide a more pleasing picture. For example, an apparatus for generating the two groups of concurrent signals is described in allowed U.S. Pat. No. 4,598,309, entitled, A TELEVISION RECEIVER THAT INCLUDES A FRAME STORE USING NON-INTERLACED SCANNING FORMAT WITH MOTION COMPENSATION, by R. F. Casey that is incorporated by reference herein.

Signals $I_a$, $Q_a$ and $Y_a$ are coupled to the respective terminals of an I, Q, Y matrix 439a, of conventional construction. Matrix 439a generates signals $R_a$, $G_a$ and $B_a$ that contain red, green and blue color components, respectively, from signals $I_a$, $Q_a$ and $Y_a$. Similarly, signals $I_b$, $Q_b$ and $Y_b$ are coupled to the respective terminals of a similar I, Q, Y matrix 439b. Matrix 439b similarly generates signals $R_b$, $G_b$ and $B_b$ from signals $I_b$, $Q_b$ and $Y_b$.

NTSC signal 130 of FIG. 2 is also coupled to a timing unit 430 of FIG. 1. Timing unit 430 utilizes, for example, horizontal and vertical sync pulses of NTSC signal 130 for generating a horizontal scanning control, or deflection cycle forming signal $S_{2H}$ and a vertical scanning control signal $S_V$ that are coupled to a horizontal and vertical deflection stage 500. Stage 500 controls deflection currents $i_{2H}$ and $i_V$ in a horizontal deflection winding 432 and in a vertical deflection winding 431, respectively, of CRT 119. The frequency of horizontal scanning control signals $S_{2H}$ is, illustratively, $2xf_H$, $f_H$ being the conventional scanning frequency of a standard television receiver that employs the conventional interlaced scanning format. The frequency of vertical scanning control signal $S_V$ is, illustratively, the same as in the standard television receiver. Timing unit 430 may include a phase-locked-loop circuit, not shown in FIG. 1, that is phase locked to horizontal sync pulses $h_{SP}$ of NTSC signal 130 of FIG. 2 for generating each of clock signals 230f-230i, and 230l of FIG. 1. Timing unit 430 is described in further detail later on.

Green signal $G_a$, for example, of matrix 439a is applied through a terminal F to a 1-H delay 434 and to a 1-H delay 435 of a speed-up unit 433 that time-compresses signal $G_a$. Green signal $G_b$ of matrix 439b is applied through a terminal G to a 1-H delay 436 and to a 1-H delay 437 of unit 433 that time-compresses signal $G_b$. Each of memories or 1-H delay units 434, 435, 436 and 437 may comprise first-in first-out (FIFO) buffers that may be implemented using analog or digital techniques.

FIGS. 3a–3h illustrate schematically a simplified example of timing diagrams of clocks 230f, 230g, 230h and 230i of FIG. 1, respectively, that are coupled to 1-H delay units 434, 436, 435 and 437, respectively of speedup unit 433. Similar numbers and symbols in FIGS. 1, 2 and 3a–3h represent similar items or functions. Clock 230f of FIG. 3d clocks in samples of, for example, video line 143 of signal $G_a$ of FIG. 3a into 1-H delay unit 434 of FIG. 1 between, for example, time t5 and time t8 at, illustratively, a constant first clock rate, as illustrated by the short vertical lines in the corresponding interval of FIG. 3d. Simultaneously, clock 230g of FIG. 3e clocks in samples of video line 143 of signal $G_b$, that may also be schematically represented by the timing diagram of FIG. 3a, into 1-H delay unit 436 of FIG. 1 at, illustratively, the same first clock rate. Note that the timing diagram of FIG. 3a may represent, in the respective context, any of signals, $G_a$, $G_b$, $R_a$, $R_b$, $B_a$ or $B_b$.

Figure 3:
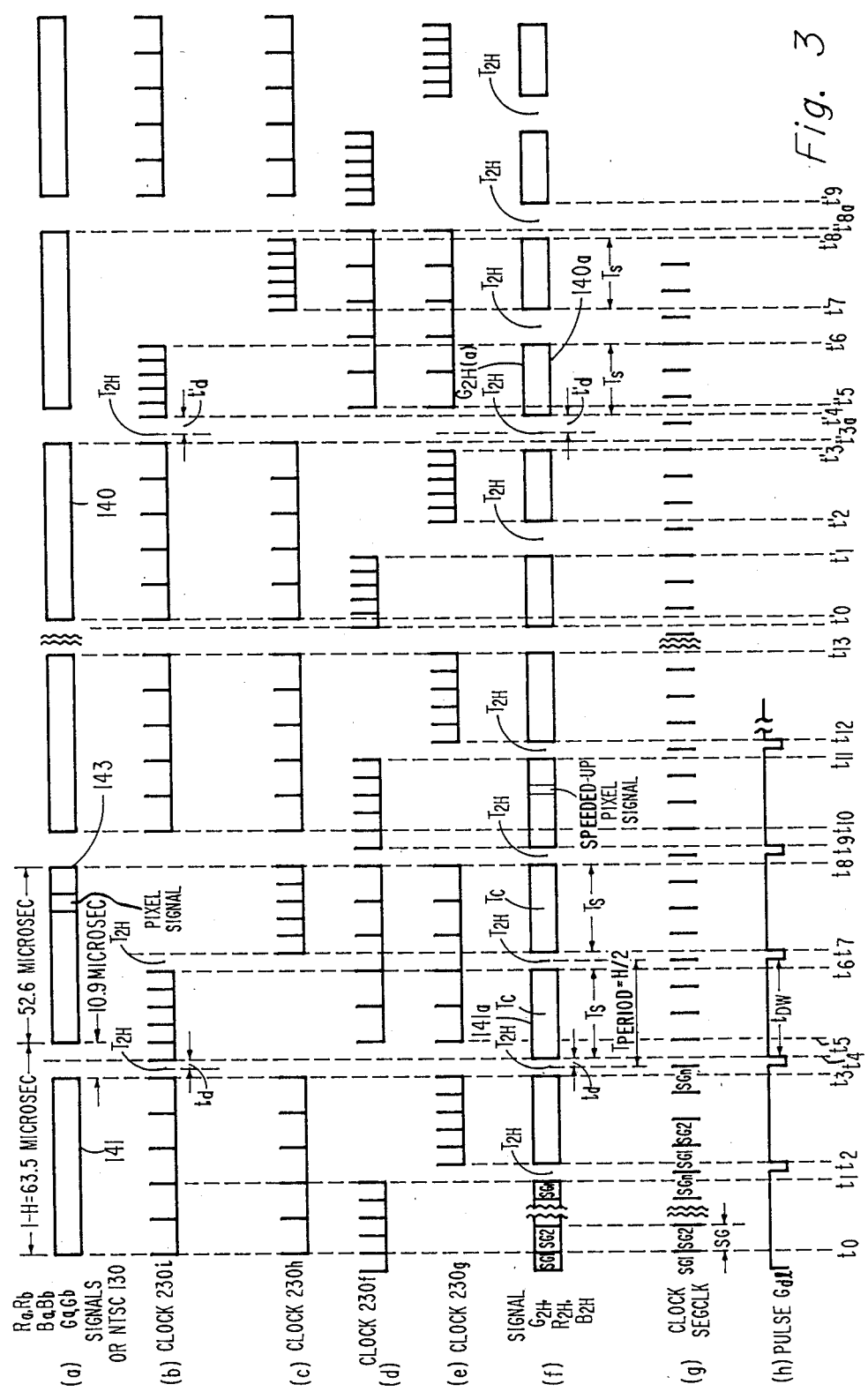
FIGS. 3a-3h illustrate, schematically, timing diagrams useful in explaining the operation of the apparatus of FIG. 1.

In accordance with an aspect of the invention, the samples in unit 434 of FIG. 1 are clocked out, or read out at a second clock rate of clock 230f that is illustrated schematically by the short vertical lines in FIG. 3d between times t9 and t11. The second clock rate may vary between times t9 and t11 for providing raster distortion compensation. The second clock rate is higher than the first clock rate so as to provide an output signal $G_{2H}$ of FIG. 3f that is speeded-up relative to, for example, signal $G_a$. Similarly, the samples in unit 436 of FIG. 1 are clocked out, or read out at, illustratively, the second clock rate, that may be also variable, of clock 230g, as illustrated schematically by the short vertical lines in FIG. 3e between times t12 and t13. The samples that are read out from unit 434 and 436, respectively, of FIG. 1 are coupled to input terminals A and B of a swtich 433a, respectively. An example of a pixel signal of signal Ga is schematically illustrated in line 143 in FIG. 3a.

FIG. 3f illustrates schematically signal $G_{2H}$ that is coupled by a wiper k of switch 433a to a terminal E. Wiper k is controlled by timing signal 230l of timing unit 430. Wiper k couples to terminal E the speeded-up samples, or pixel signals, that are read out of unit 434 and that appear at terminal A, to form the corresponding signal of speeded-up video line signal $G_{2H}$ between, for example, times t9 and t11, as illustrated in FIG. 3f. An example of a speeded-up pixel signal is schematically illustrated in FIG. 3f for the video line signal $G_{2H}$ between times t9–t11. Likewise, wiper k of FIG. 1, in response to timing signal 230l couples the speeded-up samples, or pixel signals, that are read out of unit 436 and that appear at terminal B, to output terminal E between, for example, times t12 and t13 of FIG. 3f.

In a like manner, clock 230h of FIG. 3c clocks samples of video line 141 of signal $G_a$ of FIG. 3a between time t0 and time t3 into 1-H delay unit 435 of FIG. 1 at the first clock rate as illustrated by the short vertical lines in FIG. 3c. Simultaneously, clock 230i of FIG. 3b clocks samples of video line 141 of signal $G_b$ of FIG. 3a into 1-H delay unit 437 of FIG. 1 at the same first clock rate. In a similar manner to that described before, the samples in unit 435 of FIG. 1 are clocked out or read out at the variable second rate of clock 230h, as illustrated schematically in a simplified manner by the short vertical lines of clock 230h in FIG. 3c between times t7 and t8. The samples in unit 437 of FIG. 1 are clocked out or read out at the variable second rate of clock 230i, as illustrated schematically in a simplified manner by the short vertical lines of clock 230i of FIG. 3b, respectively, between times t4 and t6. The samples from unit 435 and 437 of FIG. 1 are coupled to terminals C and D of switch 433a, respectively.

Wiper k couples the samples, or pixel signals of unit 435 at terminal C to output terminal E between times t7 and t8 of FIG. 3f for generating speeded-up signal $G_{2H}$; likewise, wiper k of FIG. 1 couples the samples, or pixel signals, of unit 437 at terminal D to terminal E between times t4 and t6. Thus, signal $G_{2H}$ of FIG. 3f that appears at terminal E of FIG. 1 contains the speeded up, time-multiplexed, picture information of signals $G_a$ and $G_b$ of FIG. 3a. The picture information of signals $G_a$ and $G_b$ appears in alternate time slots, respectively, such as, for example, intervals t4–t6 and t7–t8, respectively, of FIG. 3f to form signal $G_{2H}$. Signal $G_{2H}$ is applied to control the green electron beam gun of CRT 119.

A speedup unit 433" in FIG. 1, that is, illustratively, constructed similarly to speedup unit 433 has terminals E", F" and G" that correspond with terminals E, F and G respectively, of speedup unit 433. Unit 433" of FIG. 1 receives from timing unit 430 clock signals not shown in FIG. 1, that are functionally equivalent to clocks 230f–230i. Unit 433" operates similarly to unit 433 for generating speeded-up red signal $R_{2H}$.

A speedup unit 433' in FIG. 1, that is, illustratively, also constructed similarly to speedup unit 433 has terminals E', F' and G' that correspond with terminals E, F and G, respectively, of speedup unit 433. Unit 433' of FIG. 1 receives from timing unit 430 clock signals, not shown in FIG. 1, that are functionally equivalent to clocks 230f–230i, respectively. Unit 433' operates simalarly to units 433 or 433" for generating speeded-up signal $B_{2H}$.

Thus, signals $R_{2H}$, $G_{2H}$ and $B_{2H}$ of FIG. 1 provide the picture information of interlaced NTSC signal 130 for display in non-interlaced display format.

In a conventional television display apparatus, raster distortions may be corrected by modulating the scanning current, such as scanning current iy of FIG. 1. In contrast, in television apparatus 150 of FIG. 1, embodying aspects of the invention, modulation of scanning current iy need not be used for accomplishing raster distortion correction.

Each pixel signal of, for example, a video line of green signal $G_{2H}$ at terminal E is coupled to the input terminal of the green electron beam gun of CRT 119 at a corresponding instant that is selected by timing unit 430.

In accordance with an aspect of the invention, the timing of such pixel signal is such that the corresponding pixel displayed on the screen of CRT 119 appears at a horizontal position of the electron beams within the scan line so as to eliminate the appearance of distortion in the displayed picture. Selectively varying the timing of the pixel signals is done to compensate for geometry distortion in CRT 119. In contrast, in a given video line n of, for example, NTSC signal 130 of FIG. 2, the pixel signals of video line n are distributed uniformly in time and should be displayed, in accordance with the NTSC standard, as uniformly distributed pixels along the corresponding scan line on the screen of CRT 119 of FIG. 1.

In some progressive scan television systems, the sample read-out rate, in a speeded-up unit that is similar to, for example, speed-up unit 433 of FIG. 1, is constant. Such constant rate may be equal to twice that of the sample write-in rate to provide double frequency scanning format. In contrast, in television apparatus 150 of FIG. 1, the sample read-out rate, such as the frequency of clock 230g of FIG. 3c, between times t2 and t3, may be different in different segments, respectively, of each scan line, as described later on. Furthermore, in other progressive scan television systems, the samples are read out, in each scan line, beginning after a constant delay time $t_d$ from, time $T_{2H}$ at, for example, the center of the preceding retrace interval.

In accordance with a further aspect of the invention, the samples, or pixel signals, associated with a given scan line are read out beginning after a delay time $t_d$ of FIG. 3f that may be different for corresponding different scan lines. In one example, the sample read-out beginning time, such as time $t_4$ of FIG. 3f, is separately controllable for each individual scan line. In a second example, the samples read-out beginning time for each group of scan lines is the same time $t_d$ that is controllable on a group of line basis.

In accordance with yet another aspect of the invention, the delay time $t_d$, as well as, for example, the sample read-out rate, may be separately and independently controlled for each of signals $G_{2H}$, $B_{2H}$ and $R_{2H}$ of FIG. 1.

FIG. 4a illustrates a hypothetical example that shows the effect of east-west raster distortion, when left uncorrected, on the image of vertical bars 71–77. The picture information of the vertical bars is contained in NTSC signal 130 of FIG. 2. Portion "a" of a scan line 40, appearing between lines 71 and 77 of FIG. 4a that is displayed at the top of the screen of CRT 119 of FIG. 1, has a length $1_a$; whereas portion "b" of a scan line 41, appearing between lines 71 and 77 of FIG. 4a at the center of the screen, has a length $1_b$ that is shorter than length $1_a$. Without being distorted, parallel portions "a" and "b" that appear in parallel on the screen of CRT 119 of FIG. 1 should have identical length, as follows from NTSC signal 130.

It may be desirable to display the entire picture information associated with portion "a" of, for example, scan line 40 in the smaller portion "a1" of scan line 40 that is situated directly above portion "b" of scan line 41, in order to make the image of, for example, vertical line 71 in scan line 40, appear on the screen directly above the corresponding image of vertical line 71 in scan line 41, as dictated by the picture information content of NTSC signal 130 of FIG. 2. In this way, east-west raster distortion may be substantially eliminated. To this end, it is desirable to begin reading out the samples, or signal pixels, that are associated with vertical bar 71 in scan line 40 of FIG. 4a, after such delay time $t_d$ that is larger than the corresponding delay time associated with the samples of vertical bar 71 in scan line 41 of FIG. 4a.

Because the electron beam velocity in the horizontal direction varies along, for example, scan line 40, it is desirable to vary the sample read-out rate, such as between times t2 and t3 of FIG. 3e, to correspond with the varying beam scanning velocity. Varying such read-out rate is desirable in order to obtain uniform distribution of the pixels displayed in, for example, scan line 40 of FIG. 4a, so as to correspond with the uniformly distributed pixel signals of incoming NTSC signal 130 of FIG. 2.

Figure 5:
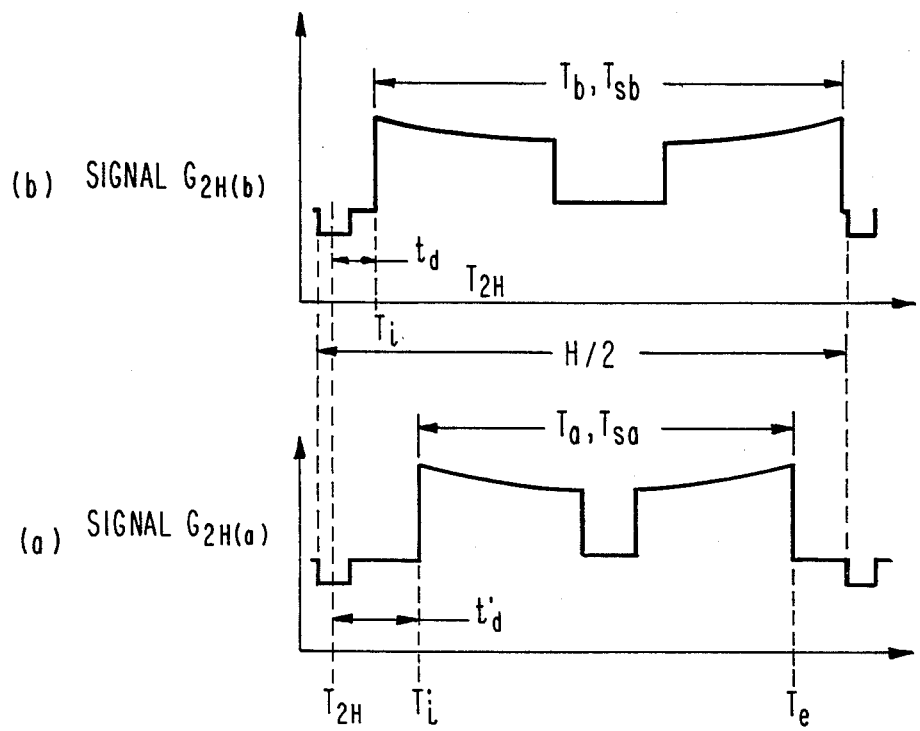
FIGS. 5a and 5b illustrate schematically two examples of video line signals that contain substantially identical picture information and that are adapted for display at the top and at the center of the raster, respectively.

In a second hypothetical example, the picture information of signals $G_{2H(a)}$ and $G_{2H(b)}$ of FIGS. 5a and 5b, respectively, of signal $G_{2H}$ of FIG. 1 is displayed on the screen of CRT 119. The screen of CRT 119 includes, for example, scan lines 40 and 41 such as shown in FIG. 4a. Signal $G_{2H(a)}$ of FIG. 5a, for example, may also be represented by portion 140a of speeded-up signal $G_{2H}$ of FIG. 3f, that is generated by television apparatus 150 of FIG. 1 and that provides a corresponding, substantially distortion free, image for display in, for example, scan line 40 of FIG. 4a. The position of scan line 40 is shown in FIG. 4a. Similarly, signal $G_{2H(b)}$, shown in FIG. 5b, contains, illustratively, picture pattern that is identical to that contained in signal $G_{2H(a)}$ of FIG. 5a and that is suitable for display in scan line 41 of FIG. 4a. As a result of raster distortion correction of apparatus 150 of FIG. 1, when the video line signals of FIG. 5a and 5b are displayed in scan lines 40 and 41, respectively, the picture patterns that are displayed in each scan line appear identical and one pattern appears directly above the other. Such pattern is, illustratively, different from the vertical bar pattern referred to in a previous example. Similar numbers and symbols in FIGS. 5a, 5b, 4a, 3a–3f, 2 and 1 illustrate similar items or functions.

The sample read-out beginning times, times $T_i'$ and $T_i$, in FIGS. 5a and 5b, respectively, are delayed by delay times $t_d'$ and $t_d$, respectively, from time $T_{2H}$, that occurs at, for example, the center of the retrace interval of the preceding speeded-up video line. Note that delay time $t_d'$ of FIG. 5a is greater than delay time $t_d$ of FIG. 5b. This is so because signal $G_{2H(a)}$ of FIG. 5a is adapted for display in scan line 40 of FIG. 4a, that is at the top of the screen; whereas, signal $G_{2H(b)}$ of FIG. 5b is adapted for display in scan line 41 of FIG. 4a that is at the center of the screen.

Video line signals $G_{2H(b)}$ and $G_{2H(a)}$ of FIGS. 5b and 5a, are provided during intervals $T_b$ and $T_a$, having durations $T_{sb}$ and $T_{sa}$, respectively. For example, the ratio $T_{sb}/T_{sa}$ in the distortion compensated signals is, illustratively, equal to the ratio $1_a/1_b$ of portions "a" and "b" of scan lines 40 and 41, respectively, of the distorted image of FIG. 4a. Thus video signal $G_{2H(a)}$ of FIG. 5a is compressed more, relative to video signal $G_{2H(b)}$ of FIG. 5b, so as to compensate for the difference in the horizontal scanning speed in the corresponding scan lines. The desired compression ratio is achieved by having the read-out clock frequency, that is used for reading out the pixel signals of scan line 41 of FIG. 4a, higher than that of the read-out clock that is used for reading out the pixel signals that are displayed in scan line 40.

Figure 6:
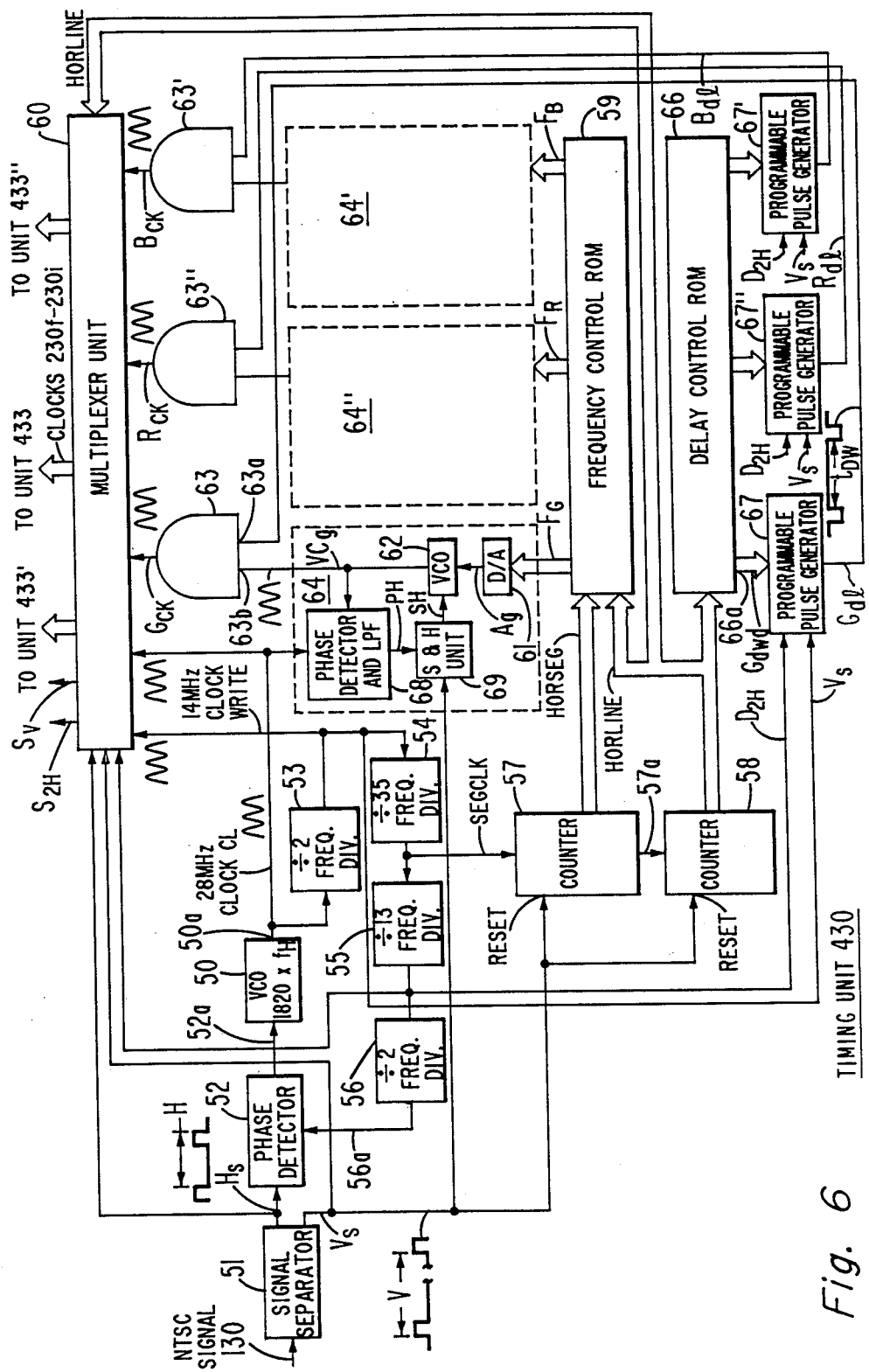
FIG. 6 illustrates a diagram of a timing unit embodying aspects of the invention, that is included in the apparatus of FIG. 1.

FIG. 6 illustrates a more detailed embodiment of timing unit 430 of FIG. 1 embodying an aspect of the invention. Unit 430 of FIG. 6 generates, for example, clocks 230f–230i that determine the sample read-out rates and delay times such as delay time $t_d$ or $t_d'$ of FIGS. 5a or 5b. Similar numbers and symbols in FIGS. 1, 2, 3a–3h, 5a, 5b and 6 indicate similar items or functions.

NTSC signal 130 of FIG. 6 is coupled to a sync separator unit 51 that supplies, in a conventional manner, a horizontal rate signal $H_s$ having a frequency of $f_H$ and a vertical rate signal $V_s$ from the corresponding horizontal and vertical sync pulses of NTSC signal 130. Horizontal rate signal $H_s$ is coupled to a phase detector 52. Phase detector 52 supplies a voltage 52a that controls the phase and frequency of a clock CL at an output terminal 50a of a VCO 50. VCO 50 provides clock CL having a frequency of, illustratively, $1820 \times f_H$. Clock CL is coupled through a chain of frequency dividers 53, 54, 55 and 56 to phase detector unit 52. The phase and frequency of a signal 56a at an output terminal that is at the end of the chain of the frequency dividers is phase-compared, in detector 52, with signal $H_s$ for supplying phase and frequency controlling voltage 52a. Voltage 52a maintains a fixed phase and frequency relationship between clock CL and signal $H_S$.

Frequency divider 53 divides the frequency of clock CL by 2 for generating a clock WRITE signal that is used for generating each of the samples write-in clocks such as used, illustratively, in speed-up unit 433 of FIG. 1.

Frequency divider 54 of FIG. 6 generates a clock SEGCLK that is illustrated schematically by the short vertical lines of FIG. 3g. Clock SEGCLK provides a discrete clocking edge in each interval SG, so as to divide each period H/2 between consecutive times $T_{2H}$ of, for example, signal $G_{2H}$ of FIG. 3f into corresponding time segments. Clock SEGCLK of FIG. 6 is coupled to a horizontal segment counter 57 operating as a sequential means that provides an output word HORSEG. Word HORSEG contains the location of a segment within each video line of, for example, signal $G_{2H}$ of FIG. 3f. Thus each speeded-up video line is divided into a predetermiend number of corresponding segments SG1-SGn. After counter 57 of FIG. 6 sequences through each of the segment intervals SG of FIG. 3g that are included in a given horizontal period H/2, it generates a signal 57a that increments counter 58. An output word HORLINE of counter 58 provides the horizontal line number within a given picture frame that is displayed in CRT 119 of FIG. 1. Illustratively, each of words HORSEG and HORLINE of FIG. 6 is initialized to zero by vertical rate signal $V_s$ of sync separator 51 at the beginning of each picture frame.

A combination word that includes both words HORSEG and HORLINE provides an input address word to a read only memory 59. Memory 59 generates corresponding correction signal, or words $F_R$, $F_G$ and $F_B$, for each such combination word during the corresponding horizontal segment interval SG. Words $F_R$, $F_G$ and $F_B$ control the frequency of clocks $R_{CK}$, $G_{CK}$ and $B_{CK}$, respectively, that are coupled, respectively, to a multiplexer unit 60 for generating the corresponding read-out clocks, as described below.

Word $F_G$ that is coupled to a digital-to-analog (D/A) converter unit 61 of a read-out clock generator 64. Converter unit 61 provides an analog control signal $A_G$ that controls, in accordance with the value of word $F_G$, the frequency of an output signal $VC_g$, produced by a VCO 62. Signal $VC_g$ is coupled via an input terminal 63b of an AND gate 63 to provide clock $G_{CK}$ that is coupled to multiplexer unit 60.

In accordance with an aspect of the invention, word $F_G$ of memory 59 controls the frequency of clock $G_{CK}$ separately for each segment interval SG of each horizontal period H/2 of FIG. 3g. Different words FG that are stored in ROM 59 are read out in corresponding different intervals SG to vary the rate of clock $G_{CK}$ from one segment interval to another in accordance with the type of distortion being corrected.

Multiplexer unit 60 of FIG. 6, that is controlled also by output word HORLINE, couples, by multiplexer operation, each of clock WRITE and $G_{CK}$ to the corresponding signal lines of FIG. 1 for developing clocks 230f, 230g, 230h and 230i, at time slots that are illustrated in FIGS. 3d, 3e, 3c and 3b, respectively.

Output signal $VC_g$ of oscillator 62 of FIG. 6 is coupled as clock $G_{CK}$ to multiplexer unit 60, starting at, for example, time $t_4$ of FIG. 3b that is delayed by an amount $t_d$ after the immediately preceding time $T_{2H}$, that is between times $t_3$ and $t_4$. The amount of delay time of variable delay $t_d$ is controlled by a control pulse $G_{dl}$ of FIG. 3h that is supplied at an input terminal 63a of AND gate 63 by a programmable pulse generator 67 of FIG. 6, as described below.

Word HORLINE supplies the address word to a memory 66. An output word $G_{dwd}$ at a port 66a of memory 66 that is selected in accordance with the corresponding state of word HORLINE is coupled to programmable pulse generator 67. Pulse generator 67 receives, at, for example, each time $T_{2H}$ of FIG. 3f, a corresponding leading edge of a clock $D_{2H}$ of FIG. 6 from divider 55 of the frequency divider chain. Pulse generator 67 counts clock WRITE pulses of FIG. 6, up to a number that is determined in accordance with the value of word $G_{dwd}$. Such counting begins, for example, with the occurrence of the leading edge of clock $D_{2H}$ at time $T_{2H}$ of FIG. 3f. At the end of such counting, generator 67 generates, at time $(T_{2H}+t_d)$, the leading edge of pulse $G_{dl}$ of FIG. 6 that occurs at, for example, time t4 in the timing diagram of FIG. 3h. The pulse width $t_{DW}$ of each pulse $G_{dl}$, for example, is sufficiently long for enabling the reading-out of all the samples stored in the corresponding 1-H delay unit such as 1-H delay 437 of FIG. 1.

During interval $t_{DW}$ of FIG. 3h of each pulse $G_{dl}$, AND gate 63 of FIG. 6 couples output signal $VC_g$ of VCO 62 to multiplexer 60 to provide the corresponding read-out clocking edges of signal $G_{CK}$. Thus, word $G_{dwd}$ that controls variable delay $t_a$ is a raster correction signal. During the intervals in which signal $G_{dl}$ is not asserted, signal $VC_g$ of FIG. 6 is blocked by AND gate 63.

In accordance with an aspect of the invention, time $(T_{2H}+t_d)$, which is the sample read-out beginning time in a corresponding video line period, may be programmable on, for example, a line-to-line basis. Alternatively, it may be programmable on a group of lines basis, with the delay being the same for all the lines within a given group.

In accordance with another aspect of the invention, the frequency of signal $VC_g$ of, for example, VCO 62 is calibrated in an interval during which, for example, signal $G_{CK}$ is not otherwise used by apparatus 150 of FIG. 1. Calibration of the frequency of signal $VC_g$ of FIG. 6 is accomplished by a phase detector 68, that compares the phase of signal $VC_g$ with that of clock CL to provide a frequency control signal PH. The frequency of signal $VC_g$ is controlled by calibrating word $F_G$ of memory 59, as described later on.

Signal PH is coupled to an input terminal of a sample-and-hold, or track-and-hold, unit 69 that, in regular and continuous operation of apparatus 50 of FIG. 1, samples signal PH of FIG. 6, during, for example, the vertical retrace interval, and holds the sampled value until the next sampling period to provide a signal SH. The sampling time is controlled by vertical sync signal $V_s$. During the period in regular operation, when calibration does not take place, such as when Clock $G_{CK}$ is required to provide the clocking signal to form clocks 230f-230i, sample and hold unit 69 provides constant signal SH that was established by the value of signal PH at the end of the preceding calibration period. Both signal SH and word $F_G$ control the frequency of signal $VC_g$ of VCO 62. During calibration, word $F_G$ of memory 66 is selected to contain a predetermined calibration value that, when VCO 62 is properly calibrated, should result in a corresponding predetermined expected frequency of signal $VC_g$ for such value of word $F_G$. Such frequency may be different than the frequency of signal VCg outside the calibration time. For example, such expected frequency may be equal to that of clock CL. Any deviation from such expected frequency, is covered by signal SH. This arrangement provides a single point correction in that correction of the frequency is performed for one value of word $F_G$.

It should be understood that a mulitple point correction scheme may be used. In such a scheme, different values of signal SH may be obtained during a calibration interval by applying, during calibration, correspondingly different values of calibration words $F_G$, respectively. Such different values of signal SH may be separately stored for usage outside the calibration interval. In such multiple point correction scheme, the value of word $F_G$ that is applied outside the calibration interval may be used for selecting the particular stored value of signal SH to be coupled to a control terminal of the oscillator for calibrating the oscillator outside the calibration interval.

Each of read-out clock generators 64' and 64" operates similarly to read-out clock generator 64 for producing the corresponding sample read-out clocks for units 433' and 433", respectively, of FIG. 1. In a like manner, each of programmable pulse generators 67' and 67" of FIG. 6 operates similarly to programmable pulse generator 67. Thus, signals $G_{2H}$, $R_{2H}$ and $B_{2H}$ of FIG. 1 may be separately controlled by clocks $G_{CK}$, $R_{CK}$ and $B_{CK}$, respectively, of FIG. 6 that may be generated, each, independently of the other two.

It should be understood that various other types of raster distortions, such as convergence error or east-west distortion, may be corrected by the arrangement of FIG. 1. For example, covergence correction may be obtained by controlling clocks $G_{CK}$, $R_{CK}$ and $B_{CK}$ separately and independently such that the pixels formed by the corresponding guns of the CRT appear at the proper location in the corresponding scan line so as to cause convergence on the CRT screen.

What is claimed is:

1. A video display apparatus responsive to an incoming interlaced video signal containing picture information for generating therefrom a noninterlaced video signal that contains in a given video line signal thereof a plurality of pixel signals derived from said interlaced video signal for display in a corresponding plurality of pixel locations of a corresponding display line of said video display apparatus, said video display apparatus being subject to a distortion that, if left uncompensated, results in erroneous pixel locations during noninterlaced display of said pixel signals, said apparatus comprising:
   a memory coupled to said interlaced video signal for storing said picture information of said interlaced video signal in said memory;
   first means coupled to said memory responsive to a varying clock signal for generating said plurality of pixel signals contained in said noninterlaced video signal from the picture information stored in said memory;
   second means for generating a correction signal that varies in accordance with said distortion; and
   third means responsive to said correction signal for generating said varying clock signal that varies in accordance with said correction signal wherein said first means generates said plurality of pixel signals in a manner that varies in accordance with said varying clock signal so as to compensate for said erroneous pixel locations.

2. A display apparatus according to claim 1 wherein said third means varies the frequency of said varying clock signal in accordance with said correction signal.

3. An apparatus according to claim 2 wherein said varying clock signal that is coupled to said memory causes said pixel signals to be read out of said memory at a rate that is in accordance with the varying frequency of said varying clock signal.

4. An apparatus according to claim 1 further comprising, means responsive to said incoming interlaced video signal for generating a deflection cycle forming signal that is coupled to a deflection winding of said video display apparatus to cause scanning in said display line of said video display apparatus and means responsive to said correction signal and to said clock signal for delaying said clock signal that causes said given video line signal that corresponds with said display line to be delayed relative to said deflection cycle forming signal by a corresponding variable delay that is determined in accordance with said correction signal so as to correct raster distortion.

5. An apparatus according to claim 1 further comprising sequential means responsive to a synchronizing signal that is included in said incoming interlaced video signal for generating a control signal having a plurality of states that occur during a given interval of said noninterlaced video signal such that a given state of said control signal is associated with a corresponding portion of said noninterlaced video signal that corresponds with at least a corresponding portion of said video line of said noninterlaced video signal, wherein said second means that generates said correction signal comprises a second memory responsive to said control signal such that said given state of said control signal selects a corresponding location in said second memory to provide, in accordance with said control signal and as an output signal of said second, said correction signal.

6. An apparatus according to claim 5 wherein said given state of said control signal corresponds with a corresponding segment of said video line signal of said noninterlaced video signal.

7. An apparatus according to claim 5 wherein said output signal of said second memory is associated with a corresponding video line signal of said noninterlaced video signal and wherein said apparatus further comprises delay means responsive to said output signal of said second memory for delaying said video line signal by a variable amount that is determined in accordance with said output signal of said second memory.

8. An apparatus according to claim 7 wherein said output signal of said second memory varies, in accordance with said correction signal, in the same manner when it is associated with each video line signal that is included within a first plurality of said video line signals and in a different manner when said output signal of said second memory is associated with a given video line that is included in a second plurality of said video line signals.

9. An apparatus according to claim 5 wherein said output signal of said second memory includes first and second parts, wherein said third means comprises a controlled oscillator, wherein said first part of said output signal is coupled to said controlled oscillator to generate an output signal of said controlled oscillator at a variable frequency that varies in accordance with corresponding variation of said first part of said output signal of said second memory and wherein said third means further comprises, means responsive to said output signal of said controlled oscillator for generating said varying clock signal at a frequency that varies in accordance with said varying frequency of said output signal of said controlled oscillator.

10. An apparatus according to claim 9 wherein said third means further comprises means responsive to said second part of said output signal of said second memory for generating a gating signal that is associated with said given video line signal and means for delaying said gating signal by an amount that is variable and that is determined in accordance with said second part of said output signal and delayed gating means responsive to said gating signal and to said output signal of said oscillator for generating from said output signal of said oscillator said varying clock signal that is delayed in accordance with said gating signal.

11. An apparatus according to claim 9 further comprising means for applying, during a calibration interval, a predetermined value of said first part of said output signal of said second memory to said controlled oscillator to obtain said output signal of said controlled oscillator at a frequency that is in accordance with said predetermined value, a source of a signal at a known second frequency, a phase detector responsive to both said signal at said known second frequency and to said output signal of said oscillator for generating a second control signal that is indicative of a frequency difference between said second frequency and that of said contolled oscillator when said predetermined value is applied, and sample means responsive to said second control signal for generating a third control signal that is coupled to said controlled oscillator for calibrating the frequency of said output signal of said controlled oscillator to be in accordance with that of said signal at said known second frequency.

12. An apparatus according to claim 11 wherein a given variation in said second control signal affects said third control signal only during said calibration interval.

13. An apparatus according to claim 11 wherein said sample means comprises a track-and-hold circuit and wherein said controlled oscillator, said track-and-hold circuit and said phase detector form a phase-lock-loop circuit during said calibration interval.

14. An apparatus according to claim 11 wherein said calibration interval occurs in a corresponding deflection cycle of said video display apparatus.

15. An apparatus according to claim 11 wherein a given state of said control signal corresponds with a corresponding segment of said video line signal and wherein said frequency of said output signal of said oscillator remains unchanged substantially throughout an interval when said segment is formed.

16. An apparatus according to claim 1 wherein said third means comprises a controlled oscillator that generates an output signal used for generating said clock signal, said varying clock signal clocking said memory to form, during a first interval, said noninterlaced video signal and wherein said apparatus further comprises means responsive to said output signal of said controlled oscillator for calibrating the frequency of said controlled oscillator during a second interval when said varying clock signal does not affect the formation of said noninterlaced video signal.

17. An apparatus according to claim 16 wherein said second interval occurs during a corresponding portion of a deflection cycle of said video display apparatus.

18. An apparatus according to claim 17 wherein calibration of said controlled oscilltor during a vertical retrace interval of said deflection cycle of said video display apparatus.

19. An apparatus according to claim 1 wherein said picture information is stored in said memory at a first rate and read out therefrom at a higher rate for generating said noninterlaced video signal that is time-compressed relative to said interlaced video signal, wherein said third means varies the frequency of said varying clock signal in accordance with said correction signal and wherein at least one of said first and higher rates is determined in accordance with the frequency of said varying clock signal such that said varying clock signal causes time-compression and distortion compensation to occur simultaneously in said memory.

20. A display apparatus responsive to an incoming video signal for generating an output video signal coupled to a video display apparatus to provide information that is displayed in a plurality of display lines on said video display that form a raster during a given deflection cycle such that a distortion in said video display apparatus that is associated with the display of picture information derived from said incoming video signal in said raster is compensated by varying said output video signal, comprising:
   a memory responsive to said incoming video signal for storing therein the picture information derived from said incoming video signal and for reading out therefrom the stored picture information to generate said output video signal that provides the stored picture information to said video display apparatus;
   means for generating a correction signal that varies in accordance with said distortion in said video display apparatus;
   a controlled oscillator for generating a first clock signal that is coupled to said memory to generate said output video signal at a rate that is determined in accordance with the frequency of said clock signal, said controlled oscillator being responsive, outside a calibration interval, to said correction signal for varying the frequency of said first clock signal in accordance with said correction signal; and
   means for generating a calibration reference signal having a value during said calibration interval that is representative of a first operating frequency, wherein said controlled oscillator is responsive during said calibration interval to said calibration reference signal for providing calibration of the operation of said controlled oscillator during said calibration interval.

21. An apparatus according to claim 20 wherein said calibrating means comprises means responsive to said first clock signal of said controlled oscillator and to said calibration reference signal for generating a control signal that varies, during said calibration interval, in accordance with a difference between the frequency of said calibration reference signal and that of said first clock signal, said control signal being coupled to said controlled oscillator for establishing the frequency of said first clock signal, during said calibration interval, to be in accordance with that of said calibration reference signal, such that, outside said calibration interval, said control signal causes the varying frequency of said first clock signal to be calibrated.

22. An apparatus according to claim 21 wherein said control signal generating means comprises a phase detector coupled to said controlled oscillator to form therewith a phase-lock-loop circuit during said calibration interval such that outside said calibration interval said second control signal is substantially constant.

23. An apparatus according to claim 22 wherein said phase-lock-loop circuit comprises a sample-and-hold circuit having an input terminal that is coupled to an output terminal of said phase detector and an output terminal that is coupled to said controlled oscillator to form said control signal that calibrates the frequency of said clock signal, said sample-and-hold circuit generating said control signal during said calibration interval such that outside said calibration interval both said correction and control signals determine the frequency of said controlled oscillator.

24. An apparatus according to claim 20 wherein said calibration interval occurs during a vertical retrace portion of said given deflection cycle.

* * * * *